May 13, 1930.  W. C. RARIG  1,758,584
TRACTOR
Original Filed April 15, 1920    7 Sheets-Sheet 2

May 13, 1930. W. C. RARIG 1,758,584
TRACTOR
Original Filed April 15, 1920 7 Sheets-Sheet 4

Inventor
Welden C. Rarig
by Sheridan, Jones, Sheridan & Smith Attys

Patented May 13, 1930

1,758,584

UNITED STATES PATENT OFFICE

WELDON C. RARIG, OF ROBSTOWN, TEXAS

TRACTOR

Application filed April 15, 1920, Serial No. 374,024. Renewed February 15, 1929.

This invention relates to improvements in tractors and its purpose is to provide an improved machine adapted for agricultural or other purposes. The principal object of the invention is to provide a tractor having improved means for varying the tread of the wheels. A further object is to provide improved means for turning the tractor. Still another object is to provide improved means, operating automatically, for oiling the tractor. In carrying out this invention means has been provided for adjusting the fenders laterally with the wheels and for extending the frame to correspond with the adjustment of the axle. A further important feature of the invention is the provision of adjustable means for forming draft connections with the tractor, whereby the connections are made at the points most favorable for the efficient operation of the tractor and most suitable for effecting an efficient operation of the implement being drawn by the tractor. The extensible axle preferably comprises an inner member and an outer member which are relatively adjustable and connected to permit the transmission of power therethrough to the supporting wheels. The hubs of the driving wheels remain upon the outer driving axles in all of the adjusted positions, but means has been provided for transmitting power to the wheels through both the inner and outer members of the axle so that the driving force is applied to the wheels substantially throughout the length of the hubs when the axle is extended. Other objects relate to various other features of construction and arrangement of the axle and other parts of the tractor and will appear more fully hereinafter.

The nature of the invention will be understood from the following specification taken with the accompanying drawings in which certain embodiments are illustrated.

Since the invention relates primarily to the extensible axle and associated parts of the tractor mechanism, the rear portion only of the tractor has been illustrated. It comprises a central gear housing 25 having axle housings 26 secured to opposite sides of the rear end thereof. The axle housings 26 have cylindrical extensions $26^a$ which engage the opposite apertures in the wall 25 and the flanges $26^b$ of the housings are secured to the gear housing by suitable bolts. An axle 27 extends through the housings 25 and 26 and is journalled at the outer ends of the axle housings in roller bearings 28. This axle 27 is formed in two sections 27ª and the inner ends of these sections are journalled in roller bearings 29 which are mounted within a central hub 30 carried by and formed integrally therewith within the housing 25. The driving and supporting wheels 31 have their hubs secured on the outer ends of the axle 27 in the manner hereinafter described.

Each section 27ª of the axle comprises an inner tube 32 and an outer tube 33. The outside diameter of each inner tube is less than the inner diameter of the outer tube and the tubes are spaced apart at their inner ends by means of spacing collars 34 which are pressed onto the inner tubes of the axle and secured in position by set screws 35. A pair of washers 36 are mounted between the ends of the sections 27ª of the axle and the inner contacting faces of these washers are provided with spiral grooves 36ª which permit the circulation of oil from their outer peripheries toward their central apertures 36ᵇ by which a communication is formed between the inner tubes of the two axle sections. An oil hole 37 is provided through the upper portion of the hub 30 by which the roller bearings 29 are supported, and this oil hole permits the flow of oil from the interior of the gear housing 25 through the spiral grooves 36ª to the interior of the inner axle tubes 32.

Figure 6:
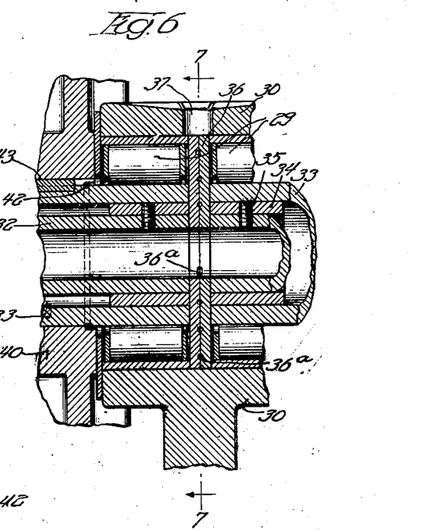
Fig. 6 shows an enlarged detailed sectional view similar to that of Fig. 5 through the central portion of the axle and the central bearing therefor.
Figure 7:
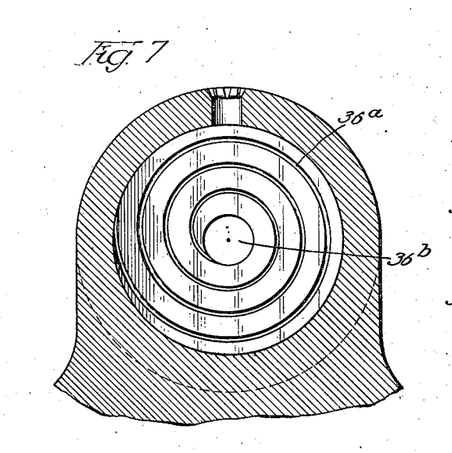
Fig. 7 shows an enlarged vertical section on the line 7—7 of Fig. 6.
Figure 8:
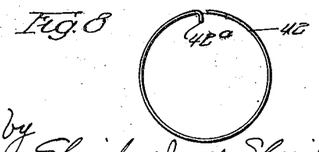
Fig. 8 shows a side elevation of one of the clamping rings by which the driving gears are secured to the axle sections.

A pair of gears 40 are secured to the outer tube 33 of the axle on opposite sides of the central hub 30 by means of keys 41 and longitudinal movement of these gears with respect to the outer tube 33 is prevented by means of a pair of resilient clamping rings 42 which are adapted to lie in grooves 43 formed in the outer surfaces of the axle tubes and to engage corresponding annular recesses in the inner ends of the hubs of the gears, as shown in Fig. 6. Each clamping ring 42 has a radial extremity 42ª which engages a corresponding aperture in the outer tube and thus holds the clamping ring securely in position. These rings prevent longitudinal movement of the outer tubes 33 with respect to the gears 40 and they also maintain the outer tubes in their proper position within the roller bearings 29 by reason of the fact that the gears 40 are located between the bearings 29 and the pairs of washers 44 which lie between the hubs of these gears and the radial extensions 26ᵇ which are formed on the axle housings.

Figure 9:
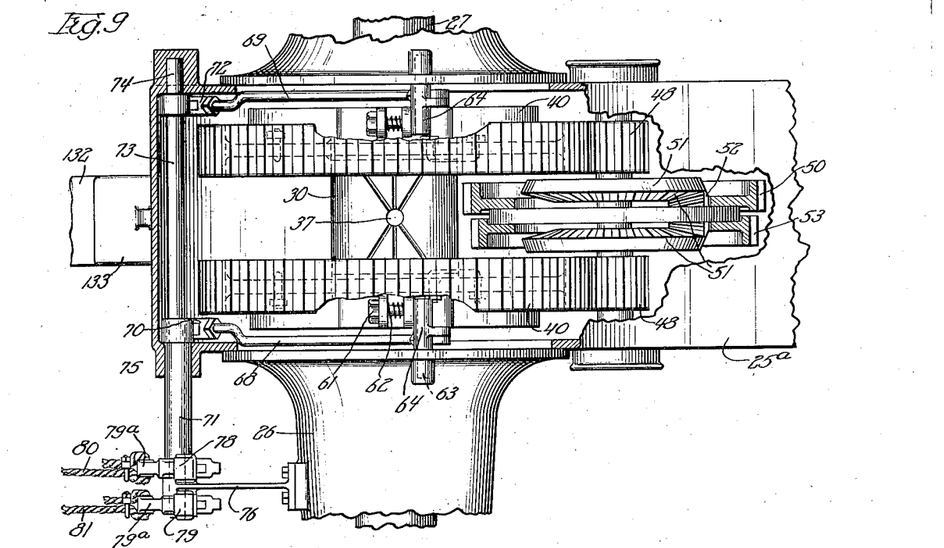
Fig. 9 shows an enlarged top plan view of the gear housing with a portion thereof broken away to illustrate the internal mechanism.
Figure 10:
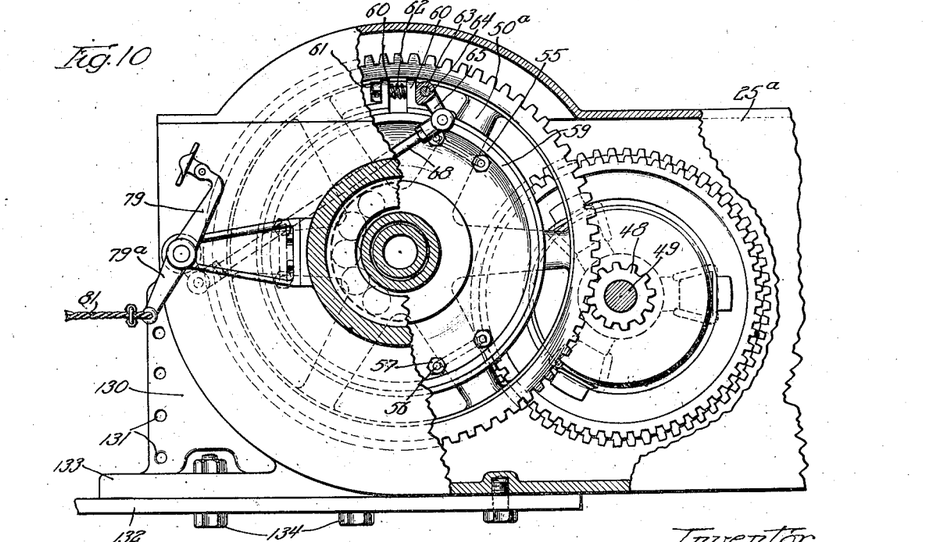
Fig. 10 shows an enlarged section of the gear housing with a portion thereof broken away to illustrate the internal mechanism.
Figure 11:
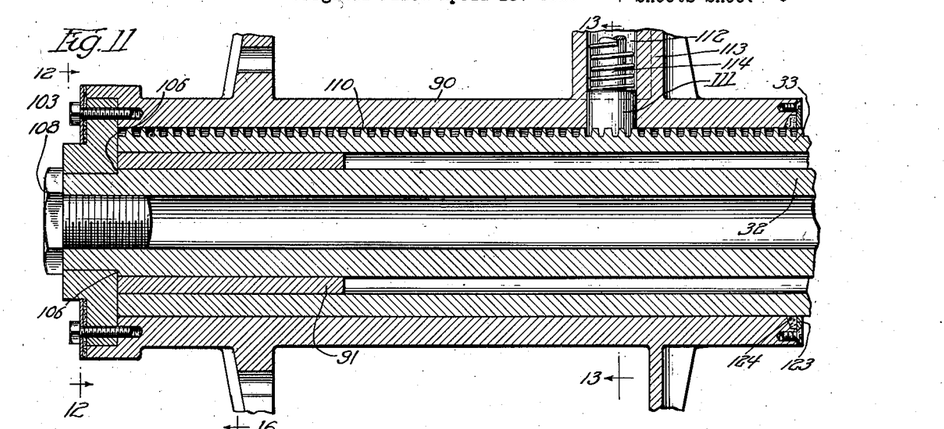
Fig. 11 shows an enlarged sectional view through the outer end of the axle and the hub of the wheel, the section being taken on the line 11—11 of Fig. 12.
Figure 12:
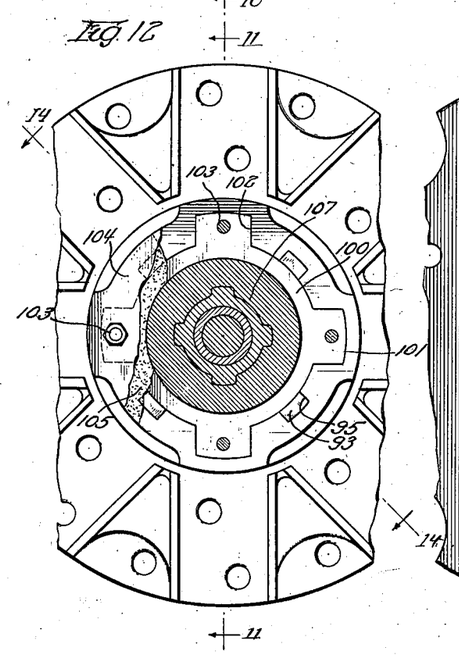
Fig. 12 shows an end elevation of the hub and a vertical section through the axle members on the line 12—12 of Fig. 11.
Figure 13:
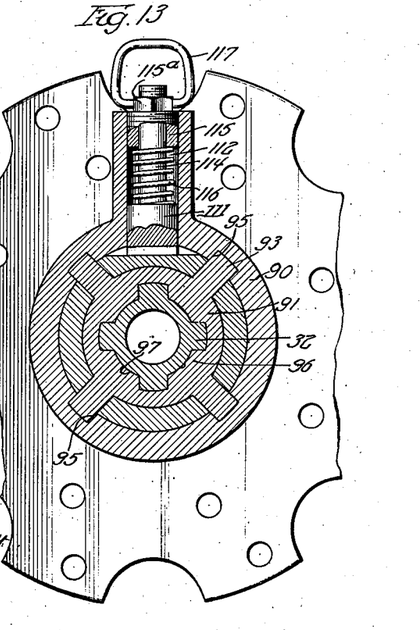
Fig. 13 shows a vertical section on the line 13—13 of Fig. 11.

The gears 40 mesh with the driving pinions 48, shown particularly in Figs. 9 and 10. These pinions are mounted on a shaft 49 which is journalled in bearings carried by the gear housing 25 and the shaft 49 carries the spur ring gears 50 by which the pinions 48 are driven. The bevel gears 51 with the pinions 52 form a differential driving mechanism in connection with the driving gears 50. The gears 50 are operated by mechanism of any suitable form contained within the forward extension 25ª of the gear housing. This driving mechanism serves to operate the differential driving gears so that one section 27ª of the driving axle is capable of being rotated faster or slower than the other section of the axle, which is required in turning the tractor, for example.

The rotation of the independent sections of the axle is controlled by means of brakes comprising brake drums 55 which are secured to the spokes 50ª of the driving gears by means of clamping bolts 56 and nuts 57. These brake drums are adapted to be engaged by the brake straps 59 which extend around them and which are provided with outwardly extending ears 60 at their ends. The ears 60 are engaged by bolts 61 each having a spring 62 mounted thereon to effect a normal separation of the ears 60 and a consequent release of the connected brake strap from its brake band 55. The bolts 62 have small shafts 63 journalled in the ends thereof and these shafts 63 have cams 64 mounted thereon to coact with the adjacent faces of the ears 60. When the shafts 63 are rotated by the crank arms 65, the cams 64 force the ears 60 on the brake straps inwardly toward each other and thereby cause the brake strap 59 to grip the brake bands.

The crank arms 65 are operated by means of connecting rods 68 and 69, one of these connecting rods 68 is connected to a crank arm 70 secured to a sleeve 71 and the other connecting rod 69 is connected to a crank arm 72 which is fixed on the shaft 73. The shaft 73 is journalled in a bearing 74 and extends through the sleeve 71 which is located at the opposite side of the housing 25 and which is journalled in another bearing 75 carried by the opposite wall of the housing. The telescoping sleeve and shaft project from the bearing 75, as illustrated in Fig. 9, and the outer end of the sleeve 71 is journalled in a bracket 76 which is secured to one of the axle housings 26. The sleeve 71 has a pedal 78 secured to the end thereof adjacent the bracket 76 and a similar pedal 79 is secured to the projecting end of the shaft 76 on the other side of the bracket. These pedals are capable of being operated by the driver in order to actuate the connected mechanism and thereby apply the brakes. If the seat of the driver is not located adjacent the axle of the tractor, the brakes may be operated by means of the crank arms 78ª and 79ª, which may be formed as parts of the pedals and which are connected at their lower ends to the flexible members 80 and 81, respectively. These flexible members may be extended longitudinally of the machine and operated by pedals located adjacent the driver's seat.

By means of this mechanism either brake may be operated independently of the other in order to effect an independent retardation of either section of the driving axle. This braking mechanism enables the tractor to be turned in a radius equal to its wheel base.

The outer ends of the axle housings 26 are closed by annular cap members 84 which are secured to the ends of the housings by cap screws 85. These caps have annular felt washers 86 mounted therein to coact with the peripheral surfaces of the outer tubes 33 of the axles so that the passage of oil through the outer ends of the housing around the axle is prevented. The axles are engaged at opposite ends of the housings 26 by the hubs 90 of the supporting wheels 31.

Similar connections are provided for securing each hub 90 to one outer sleeve 33 of the axle and for permitting the longitudinal extension of the axle by the telescoping movement of the inner and outer tubes and it is therefore sufficient to describe this mechanism for one end of the axle. The inner tube 32 is spaced from the outer tube 33 at their outer ends by means of a coupling and spacing sleeve 91 which has a driving fit with the outer tube 33 and is further secured thereto by means of a set screw 92. The spacing sleeve 91 coacts with the spacing collar 34 to restrict the friction surfaces between the inner and the outer axles, thus greatly facilitating the longitudinal movement of the inner axle and the wheel with respect to the outer axle. The spacing sleeve 91 and the collar 34 also serve to create a space between each inner and outer axle member through which oil is conducted for the lubrication of all parts of the axle and hub mechanism, as hereinafter described. All contacting and wearing surfaces of the axle members and the hubs are thus thoroughly lubricated automatically. The coupling sleeve 91 is provided on its outer side with four radially projecting keys or lugs 93 which are formed integrally therewith and which engage the longitudinal notches 94 extending inwardly from the ends of the outer tubes 33. These lugs 93 project beyond the outer surfaces of the tubes 33 and engage longitudinal keyways 95 which are formed in the hub 90, so that a driving connection is thus formed between the outer tube and the hub while permitting longitudinal movement of the hub on the outer tube. The coupling sleeve 91 is further provided with four inwardly projecting lugs or keys 96 which engage longitudinal keyways 97 formed in the outer surfaces of the inner tubes 32. These keyways extend substantially throughout the length of the hub 90 and are adapted to permit a longitudinal movement of the inner tube with respect to the outer tube and the coupling sleeve. The outer end of the hub 90 is closed by a driving cap 100 which is provided around its periphery with four radially projecting lugs 101 adapted to engage the notches 102 which are formed in the end of the hub. This cap 100 is secured to the hub by a series of cap screws 103 which pass through the lugs 101 and these cap screws also serve to secure in position a cover plate 104 which extends around the annular shoulder 100ª of the cap member and maintains a washer 105 of felt or the like in position against the face of the cap member and the end of the hub in order to prevent the leakage of oil from the end of the hub. The inner tube 32 is slightly reduced in diameter at its outer end to provide a shoulder 106 against which the cap member 100 is adapted to seat and the member 100 is provided with a plurality of inwardly projecting lugs 107 which are adapted to engage the previously described keyways 95 formed in the inner tube. The cap member is secured in fixed relation to the inner tube by means of a clamping screw 108 which threadedly engages the inner tube 32 and which has a head overlapping the cap member 100.

Figure 5:
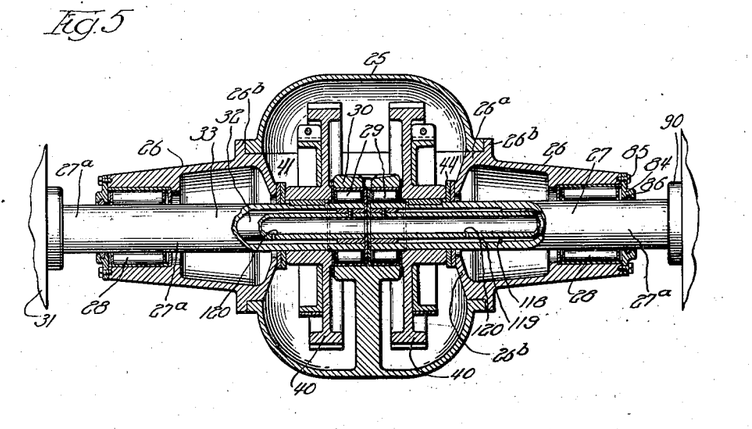
Fig. 5 shows a longitudinal vertical section through the axle housing and a portion of the axle taken on the line 5—5 of Fig. 1.

The hub 90 and the inner tube 32 are connected together through the cap member 100 and when it is desired to extend the axle longitudinally the hub and the inner tube are both moved outwardly on the outer tube 33. During this movement the coupling member 91 remains fixed with respect to the outer tube 33 and the outwardly extending lugs 93 moved in the keyways 95 while the inwardly extending lugs 96 of the coupling member slide in the keyways 97 formed in the inner tube. A driving connection is thus formed between the outer tube and the hub through the coupling member 91 in all positions of the hub on the axle. A driving connection is also established between the inner tube 32 and the hub through the cap member 100 which has a keyed connection with both the inner tube and the hub. In order to secure the hub in the desired adjusted position on the axle, the outer tube 33 is provided along one side thereof, the upper side thereof as shown in the drawings, with a plurality of transverse teeth or serrations 110 which are adapted to be engaged by corresponding teeth formed on the lower end of a cylindrical locking member 111 which is adapted to slide in a cylindrical bore 112 extending through the hub of the wheel and through a boss 113 formed integrally with the hub. The locking member 111 has a stem 114 which slidably engages a plug 115 having a threaded connection with the upper end of the bore 112. A coil spring 116 is mounted on the stem 114 between the plug 115 and the locking member and this spring serves normally to force the locking member into engagement with the teeth 110. The upper end of the stem 114 has a ring 117 extending therethrough and this ring is adapted to rest in a transverse groove or notch 118 which is formed in the upper side of the hexagonal head 115ª of the plug. To move the locking member out of engagement with the teeth 110 it is merely necessary to elevate the plug against the compression of the spring 116 by engagement with the ring 117 and then turn the plug until the arms of the ring rest upon the upper surfaces of the plug. A reverse operation will restore the engagement of the locking member with the teeth of the outer tube after the hub has been adjusted on the axle. The outward extension of the axle is limited by the spacing collars 34, previously described, which move outwardly with the inner tubes and are limited in their travel by the annular shoulders 118 which are formed at the ends of the inner portions 119 of the outer tubes which are counter-bored to have a larger inner diameter than the body portions of the tubes, as shown particularly in Fig. 5.

Figures 14, 15:
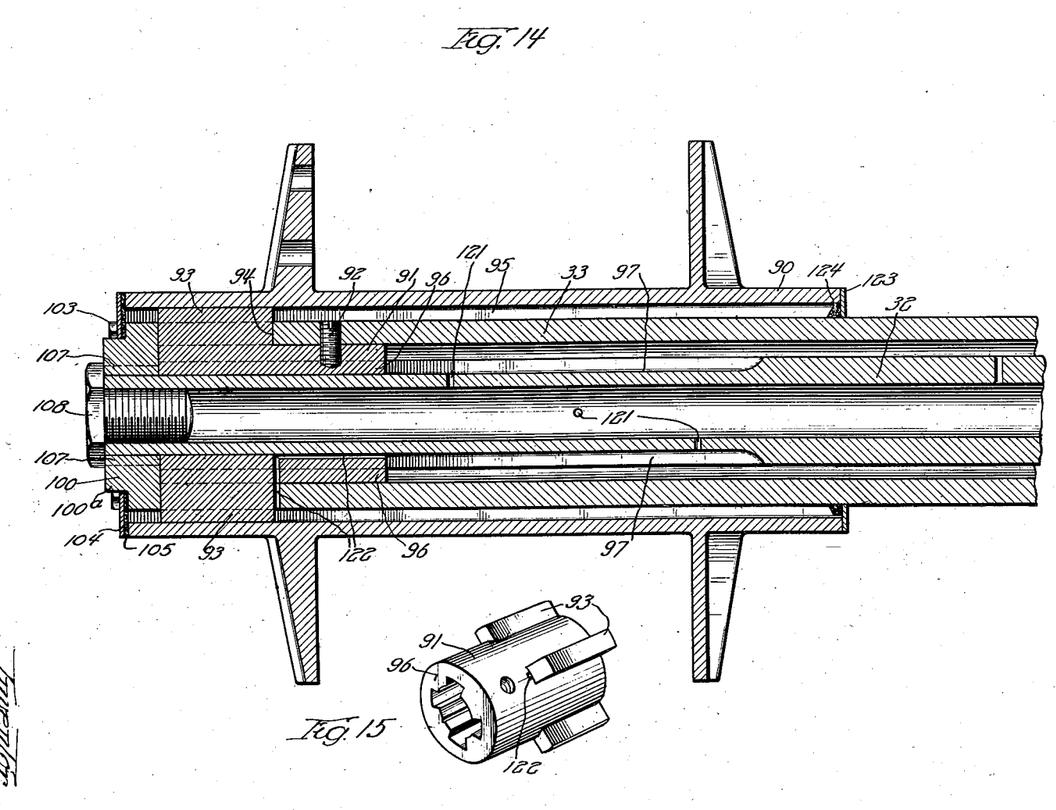
Fig. 14 shows an enlarged longitudinal section through the hub and axle on the line 14—14 of Fig. 12.
Fig. 15 shows a perspective view of one of the connecting sleeves by which power is transmitted between the tubes of the axle and between the axle and the hub.

The lubrication of the axle tubes and the hub is effected by the flow of oil through the central washers 36 and thence outwardly through the tubes. After being discharged by these central washers having the spiral oil grooves, part of the oil will tend to pass directly between the spacing collars 34 and the outer tubes and a portion thereof will flow directly outward through the inner tubes 32. Oil holes are provided within the housings, as shown at 120, for permitting the flow of oil from the inner tubes into the spaces between the inner tubes and the outer tubes. Adjacent the outer end of the axle other oil holes 121 are provided through the inner tube for permitting a further flow of oil from the inner tube to the intermediate space within the outer tube. The coupling member 91 and outer axle 33 are provided with an angular oil groove 122 formed by connecting passages in these respective parts (Figs. 14 and 15) which permits the flow of oil from the space around the inner tube to the contacting surfaces of the hub and the outer tube, as shown particularly in Figs. 14 and 15. The escape of oil from the outer end of the hub is prevented by the cover plate 104 and the felt washer 105 previously described. The escape of oil from the inner end of the hub is prevented by a retaining ring 123 which maintains a felt washer 124 in contact with the end of the hub and with the outer surface of the axle.

Figure 1:
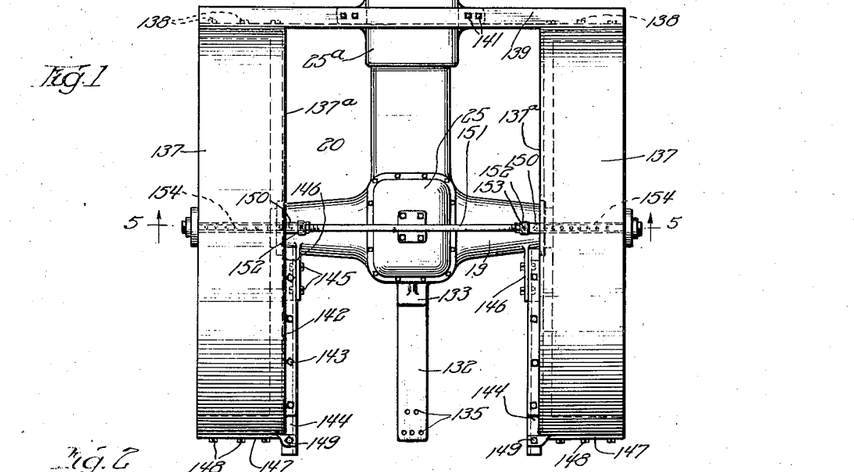
Figure 1 shows a top plan view of the rear portion of the tractor with the wheels in their inner positions.

When the tractor is used for plowing, for example, the wheels 31 may be in their innermost positions, as shown in Fig. 1, and the hitch or draft connection to the plow may be made directly to a vertical flange 130 which is formed integrally with the gear housing 25 along its rear side and is provided with a plurality of holes 131 through which a connection is made with the drawbar. A draft plate 132 is attached to the underside of the housing and to the plate 133 which is formed integrally with the flange 130 and with the housing by means of a plurality of cap screws or bolts 134. This draft plate 132 is provided with a plurality of apertures 135 adjacent its rear end which may also be used for forming a connection with the drawbar or for forming a connection with frame members hereinafter described.

When the wheels are in close spaced relation, as shown in Fig. 1, the semi-circular fenders 137 are mounted directly over the wheels and are connected at their forward ends by bolts 138 to a transverse angle bar 139 which extends above the forward extension 25ª of the gear housing and is supported by brackets 140 attached to the housing. These brackets may be attached to the housing by suitable cap screws and are detachably connected to the angle bar 139 by means of bolts 141. The fenders 137 are open to the outer sides of the wheel but are provided with vertical walls 137ª on the inner sides of the wheel and these vertical walls are provided rearwardly of the axle with flanges 142 which are secured by bolts 143 to the longitudinal frame members 144 extending parallel to the longitudinal axis of the tractor. These bars 144 are attached at their forward ends by bolts 145 to brackets 146 which are cast integrally with the housings 26. The rear extremities of the fenders are further supported by means of the arms 147 which are secured thereto by bolts 148 and which are also supported by the frame members 144 to which they are connected by bolts 149. The fenders 137 are provided directly above the axle and just within the upper walls thereof with transverse sleeves 150 which are secured to the fenders and which project inwardly therefrom. The tie rod 151 extends transversely of the tractor above the axle housing and engages both of the sleeves 150. The inner extremities 152 of these sleeves are provided with transverse apertures adapted to be engaged by pins 153 which also engage the desired pair of the series of apertures 154 which extend through the rod. This makes it possible to form a connection between the tie rod and the fenders in any adjusted position of the fenders and the wheels.

Figure 2:
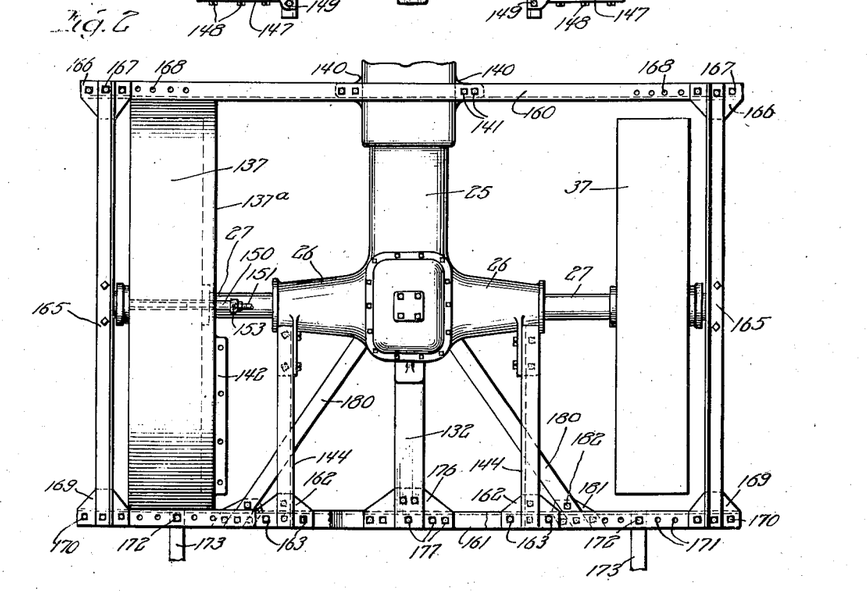
Fig. 2 shows a top plan view of the tractor with the axle and the frame extended.

The frame of the tractor is capable of being extended rearwardly and laterally in order to provide a frame construction which will be suitable for any purpose to which the tractor is applied. As illustrated in Fig. 2 of the drawings, the axle 27 is extended in order to space the wheels 31 further apart, this condition being desirable when the tractor is used for cultivating, for example, and when so extended the forward frame member 139 may be extended by bolting other frame members thereto or a new frame member 160 may be substituted therefor, this member 160 being attached to the brackets 140 in the manner previously described. When the wheels are moved outwardly, the fenders are also adjusted with the wheels and the forward ends of the fenders are attached at the desired point to the transverse frame member 160. The flanges 142 are then spaced from the longitudinal frame members 144 and it is necessary to provide other supporting means for the rear ends of the fenders. This is accomplished by providing a rear transverse frame member 161 of angular form which has its vertical flange directed downwardly and which is detachably secured to the rear ends of the frame members 144 through intermediate gusset plates 162 and detachable bolts 163. This frame member 161 is provided, like the frame member 160, with a plurality of apertures 164 in its vertical flange which permit the connection thereto of the rear ends of the fenders 137, the supporting arms 147 being now removed. When the axle and the frame are extended laterally in this manner, side frame members 165 are preferably employed and these side frame members are connected to the front transverse frame member 160 through gusset plates 166 and bolts 167, the bolts being adapted to engage any selected apertures 168 which are formed in the forward frame member. The rear ends of the side frame members 165 are connected to the rear transverse frame member 161 through gusset plates 169 and bolts 170. The horizontal flange of the rear frame member is provided with a series of apertures 171 which are adapted to be engaged by the bolts 170 and also by other bolts 172 by which connections are made to the drawbars 173. In Fig. 2 of the drawings, two drawbars 173 are shown and these are connected substantially in alinement with the centers of the wheels 31, which condition is often desirable in order to distribute the draft strains and locate the line of draft in the planes of the wheels. The series of holes 171 permit the connection of the side frame members 165 and the drawbars 173 at various points, depending upon the spaced relation of the wheels 31. In addition to the rear horizontal frame member 161, it is also preferable to provide a detachable lower transverse frame member 175 which is located beneath and parallel to the member 161. The member 175 has its vertical flange directed downwardly and the upper horizontal flange thereof is connected to the rear end of the draft plate 132 through a gusset plate 176 and detachable bolts 177. The ends of the lower transverse frame members 175 are connected to the transverse frame member 161 by means of vertical frame members 178. The lower frame member 175 is further reinforced by means of the inclined brace members 180, which are connected at their forward ends to the underside of the gear housing 25 and which diverge rearwardly therefrom, as shown in Fig. 2. These brace rods 180 are connected to the transverse frame member 175 through gusset plates 181 and bolts 182. This lower transverse frame member 175 is adapted to be used for forming a connection with the drawbar or drawbars when the tractor is used for propelling a so-called middle-buster, a form of double bladed plow which is adapted to travel along the row of the harvested crop and turn up a double furrow, thus bedding up the field into a series of parallel elevations with furrows between them.

Figure 3:
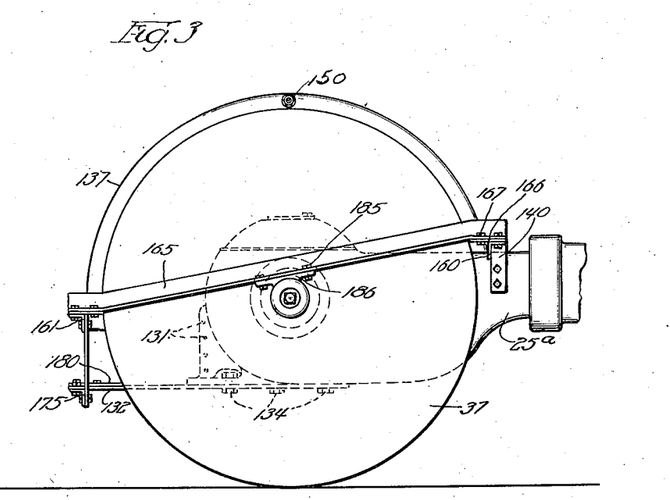
Fig. 3 shows a side elevation of the rear portion of the tractor.
Figure 4:
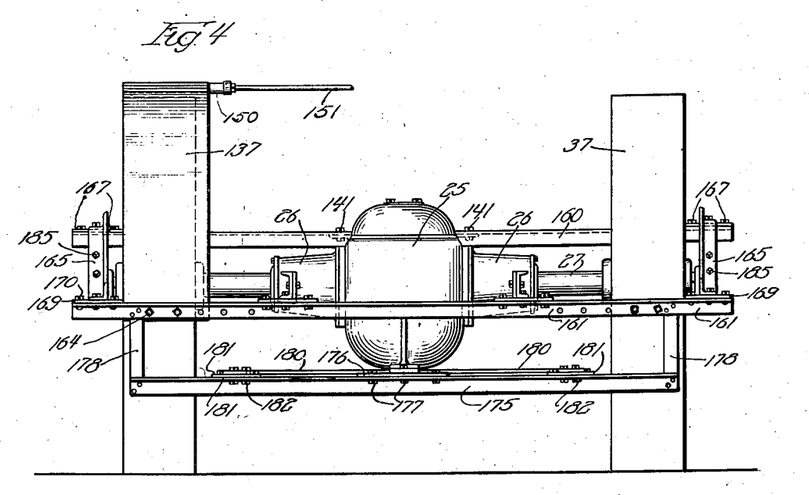
Fig. 4 shows a rear elevation of the tractor.
Figure 16:
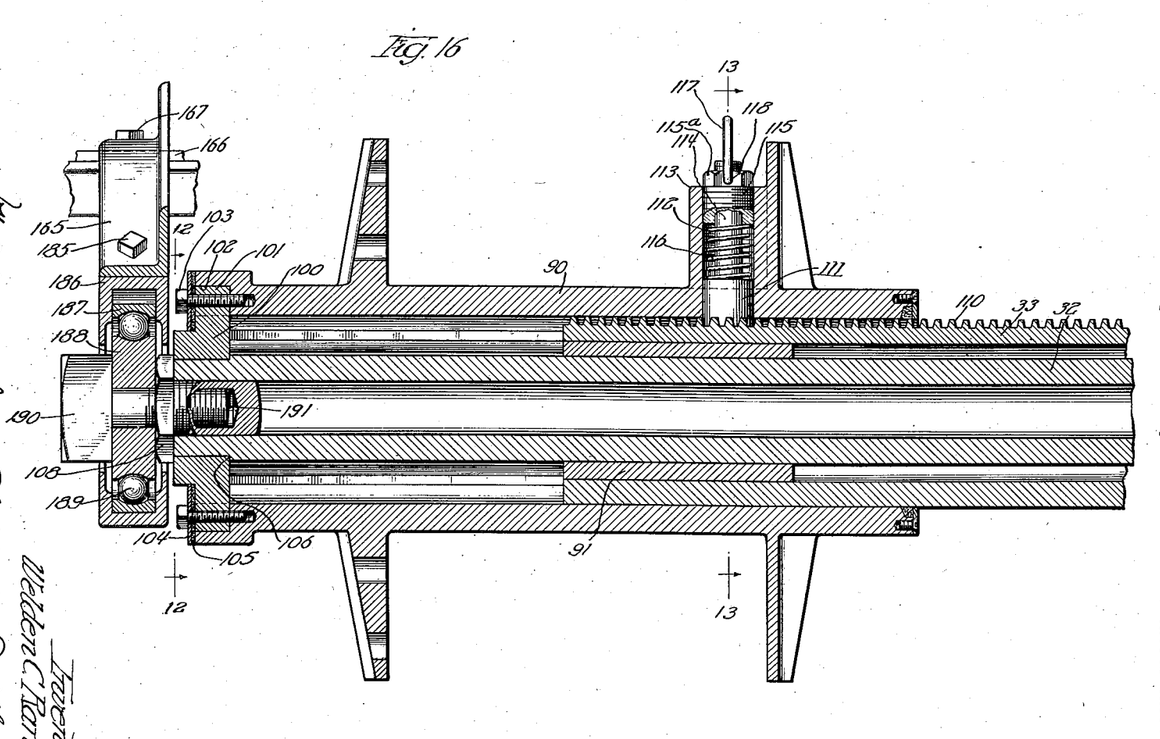
Fig. 16 shows an enlarged sectional view through the outer end of the axle when extended, the section being taken on the line 16—16 of Fig. 12.

The side frame members 165 are inclined upwardly and forwardly, as shown in Fig. 3, so that they pass above the axes of the wheels. These frame members are preferably connected by bolts 185 to bearing brackets 186 which are adapted to contain the circular members 187 and 188 which form raceways for the ball bearings 189. The inner member 188 of each ball bearing is clamped securely to the adjacent stud 108, previously described, by means of a bolt 190 which threadedly engages a recess 191 as shown in Fig. 16. A connection is thus made to the outer ends of the hubs so that the draft strains are distributed throughout the length of the axle.

In the operation of the tractor, the axle may be extended merely by releasing the locking members 111 and sliding the hubs of the wheels outwardly on the outer tube, after which the locking members are passed into locking position again in order to maintain the proper connection between the hubs and the axle. This extension of the axle may be performed manually, but I have discovered that it may be carried out more conveniently by releasing the locking members and then operating the tractor in the desired manner in order to effect a lateral thrust upon the wheels, for example, if the wheel at one side of the tractor is released and the front wheel is then turned to direct the tractor toward the opposite side, the movement of the tractor will effect a lateral thrust which will operate to move the loose wheel outwardly on the axle and thus overcome the necessity of jacking up the wheel. The same operation can then be repeated for the other wheel by turning the tractor in the opposite direction. The movement of the tractor through an S-shaped path is therefore sufficient to move both of the wheels outwardly and simultaneously extend the axle. This operation can be reversed when it is desired to move the wheels in. The operation can also be accelerated by setting the brake forward for the wheel which is fixed on the axle while the other wheel is being adjusted. Another method of bringing about this result is to set the brake for the loose wheel and turn the front wheel of the tractor toward the side on which the loose wheel is located, whereupon the free movement of the other rear wheel will operate to effect an outward adjustment of the loose wheel and the connected inner tube with respect to the outer tube of the axle.

A distinctive feature of the invention is that an adjustable axle is provided which may or may not be power driven. When the driving power is applied through this axle, either section of the axle may be retarded by means of the brakes in order to control the movement of either supporting wheel independently of the other. Either section of the axle may be adjusted independently of the other to any desired degree and in all positions of the wheel on the axle a positive driving connection is maintained between the outer tube of the axle and the hub of the wheel. This driving force may also be transmitted, as in the embodiment illustrated, through the inner tube of the axle to the hub of the wheel. This arrangement is of particular advantage when the axle is extended because the driving force is then positively applied to both ends of the hub of the wheel. The spacing collars at the inner and outer ends of the axle tubes serve to maintain an accurate centering of the tubes at all times regardless of the degree to which the axle is extended and the spacing collars at the inner ends of the inner tubes perform the additional function of limiting the extension of the axle outwardly. All of the parts of the axle construction are readily detachable and are automatically lubricated from the interior of the gear housing. The axle sections may be readily disconnected from the gears 40 by loosening the axle housings 26 from the gear housings 25 and removing the clamping rings 42. The frame of the tractor is of simple and rugged construction and this advantage is combined with means for adjusting the frame laterally with the wheels and for adjusting the position of the fenders so that they are always located directly over the wheels.

The adjustment of the supporting wheels laterally permits the arrangement of them to run astride of one or more rows of a vegetation in a field being cultivated. Two steering wheels, disposed close together, are preferably employed at the front end of the tractor and with these wheels running between two rows, it is possible for the driving wheels to be adjusted to run astride of two or more rows. The extensible axle feature may be employed in the front wheel construction so that the front wheels can be adjusted laterally with the rear wheels.

Although I have shown and described one form of the invention for purposes of illustration, it will be understood that it may be constructed in various other forms without departing from the scope of the appended claims.

I claim:

1. In a tractor, a driving axle member, a tractor wheel slidably mounted thereon, and means mounted for relative movement with respect to said driving member for extending the effective driving range thereof longitudinally and for sliding said wheel along said driving member to vary the tread of the tractor.

2. In a tractor, a hollow driving axle, a hub slidably mounted on said axle and a hollow tube mounted in said axle and connected to the hub of said wheel.

3. In a tractor, a tubular axle, a traction wheel slidably splined on said axle, means located in said axle for supporting said wheel beyond the end of said axle, and driving means connected to said axle.

4. In a tractor, a tubular driving axle, a traction wheel slidably splined upon said axle, means located in said axle for supporting said wheel beyond the end of said axle, means for locking said wheel in adjusted position longitudinally of said axle, and driving means connected to said axle.

5. In a tractor, a tubular outer axle member, a traction wheel having its hub slidably and non-rotatively mounted on said tubular axle member, and means located within said tubular axle member and connected to the outer portion of said hub for reinforcing the support of said wheel on said axle member.

6. In a tractor, a tubular outer axle, supporting wheels having their hubs slidably mounted on said axle, inner axle members slidably mounted within said tubular axle members and connected at their outer ends to the hubs of said wheels, and driving means connected to said outer axle.

7. The combination in a tractor of a driving axle formed in two sections, supporting wheels mounted on said sections, a pair of gears each mounted on the inner end of one of said sections, differential driving mechanism connected to said gears, a pair of brake drums each mounted on one of said gears, brake straps engaging said drums, and means for actuating said brake straps.

8. In a tractor, an axle housing comprising an enlarged central portion, an axle comprising two sections each journalled in said housing, differential driving mechanism connected to said axle sections in the central portion of said housing, supporting wheels slidably and non-rotatively mounted on the outer ends of said axle sections, and means located within said axle sections and connected to said wheels for reinforcing the support of said wheels when they are adjusted outwardly on said axle sections.

9. The combination in a tractor of an outer axle, supporting wheels slidably and adjustably mounted on said outer axle, and inner axle members slidably mounted within said axle and connected to said wheels.

10. In a tractor, a driving axle comprising inner and outer tubular members, said axle members being formed in two sections, traction wheels mounted on the outer ends of said outer members, said traction wheels and said inner members being adjustable longitudinally of said outer members, and means communicating with the inner ends of said inner and outer axle members for effecting the circulation of oil therethrough.

11. The combination in a tractor of a tubular axle, wheels slidably and adjustably mounted on said axle, and inner axle members movable longitudinally of said tubular axle, and connected to the outer ends of the hub of said wheels to move outwardly therewith.

12. In a tractor, an axle formed in two sections, each section comprising an outer member and an inner member, supporting wheels slidably mounted on the outer ends of said outer members and having a driving engagement therewith, said inner members being connected at their outer ends to said wheels and being adjustable longitudinally therewith, and gears connected to the inner ends of said outer members.

13. The combination in a tractor of an axle comprising a rotatable tubular outer member and an inner member, means for spacing said inner member from the inner surface of said outer member, and a traction wheel having a driving engagement with said outer member and a rigid connection with said inner member.

14. The combination in a tractor of an axle formed in two sections, each section comprising a tubular outer member and an inner member mounted concentrically therein, said inner members being adjustable longitudinally of said outer members, wheels adjustably mounted on said outer members, means for forming a driving connection between said outer members and said wheels, and means for forming a driving connection between said inner members and the outer ends of said wheels.

15. The combination in a tractor of a driving axle formed in two sections, each comprising telescoping members adjustable longitudinally, wheels mounted on said axle, driving mechanism connected to the sections of said axle, longitudinal frame members connected to the outer ends of the telescoping members of said axle, and transverse frame members adjustably connected to said longitudinal frame members.

16. The combination in a tractor of a driving axle formed in two sections, each comprising telescoping members adjustable longitudinally, wheels mounted on said axle, driving mechanism connected to the sections of said axle, longitudinal frame members connected to the outer ends of the telescoping members of said axle, and transverse frame members located rearwardly of said wheels and adjustably connected to said longitudinal frame members.

17. The combination in a tractor of a driving axle formed in two sections, each comprising telescoping members adjustable longitudinally, wheels mounted on said axle, driving mechanism connected to the sections of said axle, longitudinal frame members connected to the outer ends of the telescoping members of said axle, upper and lower transverse frame members located rearwardly of said wheels, and means for adjustably connecting the rear ends of said longitudinal frame members to said transverse frame members.

18. The combination in a tractor of an axle comprising two sections, each section comprising a rotatable outer member and an inner member, means located at the inner ends of said sections for spacing said inner members from the inner surfaces of said outer members, and traction wheels mounted on the outer ends of said outer members and rigidly connected to the outer ends of said inner members.

19. The combination in a tractor of an axle comprising two sections, each section comprising a rotatable outer member and an inner member, means located at the inner ends of said sections for spacing said inner members from the inner surfaces of said outer members, traction wheels mounted on the outer ends of said outer members and rigidly connected to the outer ends of said inner members, and driving means connected to the inner ends of said outer members.

20. The combination in a tractor of an axle housing, an axle comprising two sections journaled in said housing, each section of said axle comprising a rotatable tubular outer member and an inner member adjustable longitudinally of said axle, and spacing means at the inner and outer ends of each of said axle sections for spacing said inner members from said outer members.

21. The combination in a tractor of a driving axle comprising two sections, each of said sections being extensible longitudinally, driving mechanism connected directly to the inner ends of said sections for rotating each section independently of the other, and traction wheels mounted on and adjustable with the outer ends of said sections.

22. The combination in a tractor of an axle comprising telescoping members, means for adjusting the relative positions of said members, a supporting wheel, and means forming a supporting connection between said wheel and each of said telescoping members in all adjusted positions of said members.

23. The combination in a tractor of an axle comprising an outer member and an inner member, driving means connected to said outer member, a wheel mounted on said outer member, and means for adjusting said wheel and said inner member longitudinally of said outer member.

24. The combination in a tractor of an axle comprising an outer member and an inner member, a wheel having non-rotative engagement with said outer member and with said inner member, and means for adjusting said wheel and said inner member longitudinally of said outer member.

25. The combination in a tractor of an axle comprising an outer member and an inner member, a wheel having non-rotative engagement with said outer member and with said inner member, means for adjusting said wheel and said inner member longitudinally of said outer member, and means for securing said wheel in its adjusted position.

26. The combination in a tractor of an axle formed in two sections, each section comprising an inner member and an outer member, differential driving mechanism connected to the inner ends of said outer members, wheels connected to the outer ends of said outer members and said inner members, and means for adjusting said wheels and said inner members longitudinally of said outer members.

27. The combination in a tractor of an axle formed in two sections, each section comprising an inner member and an outer member, differential driving mechanism connected to the inner ends of said outer members, wheels connected to the outer ends of said outer members and said inner members, means for adjusting said wheels and said inner members longitudinally of said outer members, and braking means for independently retarding the rotation of either of said outer members.

28. The combination in a tractor of an axle formed in two sections, wheels mounted on the outer ends of said sections, means for adjusting said sections longitudinally, gears mounted on the inner ends of said sections, differential driving mechanism connected to said gears, brake drums mounted on said gears, and brake straps adapted to coact with said brake drums to control the rotation of said sections.

29. The combination in a tractor of an axle formed in two sections, gears mounted on the inner ends of said sections, a housing inclosing said gears, bearings mounted in said housing and having said axle journalled therein, wheels mounted on the outer ends of said axle, means for varying the effective length of the sections of said axle longitudinally, differential driving mechanism connected to said gears, brake drums connected to said gears, and brake straps adapted to engage said brake drums to control the rotation of the sections of said axle.

30. The combination in a tractor of an axle comprising inner and outer telescoping members mounted for relative longitudinal movement, driving mechanism for operating said axle, a housing containing said mechanism, and means to permit the passage of oil from said housing into the space between said inner and said outer members.

31. The combination in a tractor of an axle comprising inner and outer telescoping members, driving mechanism for operating said axle, a housing containing said mechanism, wheels mounted on the outer ends of said outer members, and means to permit the passage of oil outwardly from said housing through the space between said inner and outer members and outwardly through said outer members within the hubs of said wheels.

32. The combination in a tractor of an axle formed in two sections, gears mounted on the inner ends of said sections, a housing inclosing said gears, a bearing carried by said housing between said gears and having the inner ends of said axle sections journalled therein, said sections comprising inner and outer members, and means for permitting the passage of oil from said housing through said bearing into the spaces betwen said inner and outer members.

33. The combination in a tractor of an axle formed in two sections, each section comprising an outer member and an inner member, gears detachably secured to the inner ends of said outer members, supporting wheels having a driving engagement with the outer ends of said outer members and with the outer ends of said inner members, and means for adjusting said wheels and said inner members longitudinally of said outer members.

34. The combination in a tractor of an axle comprising an outer member and an inner member, a wheel having non-rotative engagement with said outer member and with said inner member, a frame mounted on said outer member and connected to the end of said inner member, means for adjusting said wheel and said inner member longitudinally of said outer member, and means for extending said frame longitudinally of said axle.

35. The combination in a tractor of an axle comprising inner and outer telescoping members, driving mechanism connected to said outer member, a wheel having its hub mounted on said outer member, means for forming a non-rotative engagement between said hub and said outer member, and means for forming a non-rotative engagement between said hub and said inner member.

36. The combination in a tractor of an axle comprising inner and outer telescoping members, driving mechanism connected to said outer member, a wheel having its hub mounted on said outer member, means for forming a non-rotative engagement between said hub and said outer member, means for forming a non-rotative engagement between said hub and said inner member, and means for adjusting said hub and said inner member longitudinally of said outer member.

37. The combination in a tractor of an axle comprising inner and outer telescoping members, driving mechanism connected to said outer member, a wheel having its hub mounted on said outer member, means for forming a non-rotative engagement between said hub and said outer member, said hub and said inner member being adjustable longitudinally of said outer member, and means for securing said hub in adjusted position on said outer member.

38. The combination in a tractor of an axle, a wheel mounted on said axle, said axle having transverse serrations therein, a locking member mounted in the hub of said wheel and having teeth adapted to engage said serrations, and means for operating said locking member.

39. The combination in a tractor of a tubular axle member, a wheel having its hub mounted on said axle member, a coupling member having a fixed engagement with said axle member within said hub and having radial lugs extending beyond said axle member, said hub having longitudinal key-ways to be engaged by said lugs, and means for securing said hub in position longitudinally of said axle member.

40. The combination in a tractor of an outer tubular axle member, an inner axle member located within said outer member, and a coupling member forming a non-rotative engagement between said outer member and said inner member and between said outer member and said hub.

41. The combination in a tractor of an outer tubular axle member, an inner axle member located within said outer member, a coupling member forming a non-rotative engagement between said outer member and said inner member and between said outer member and said hub, and independent means for forming a non-rotative engagement between the outer end of said inner member and said hub.

42. The combination in a tractor of an outer tubular axle member, an inner axle member located within said outer member, driving mechanism connected to said outer member, a supporting wheel having its hub engaging said outer member, said hub and said inner member being provided with longitudinal key-ways, coupling means secured to said outer member and having parts engaging the key-ways of said hub and said inner member, and a cap member connected to said hub and attached to said inner member.

43. The combination in a tractor of an outer tubular axle member, an inner axle member located within and adjustable longitudinally of said outer member, driving mechanism connected to said outer member, a supporting wheel having its hub engaging said outer member, said hub and said inner member being provided with longitudinal key-ways, coupling means secured to said outer member and having parts engaging the key-ways of said hub and said inner member, and a cap member having parts engaging the key-ways of said inner member and having other outwardly projecting lugs, said hub having notches to be engaged by said lugs.

44. The combination in a tractor of an outer tubular axle member, an inner axle member located within and adjustable longitudinally of said outer member, driving mechanism connected to said outer member, a supporting wheel having its hub engaging said outer member, said hub and said inner member being provided with longitudinal key-ways, coupling means secured to said outer member and having parts engaging the key-ways of said hub and said inner member, a cap member having parts engaging the key-ways of said inner member and having other outwardly projecting lugs, said hub having notches to be engaged by said lugs, means for securing said lugs to said hub, and means for securing said cap member to said inner axle member.

45. The combination in a tractor of an outer tubular axle member, an inner axle member located within said outer member, driving mechanism connected to said outer member, a supporting wheel having its hub engaging said outer member, said hub and said inner member being provided with longitudinal key-ways, coupling means secured to said outer member and having parts engaging the key-ways of said hub and said inner member, a cap member connected to said hub and having parts engaging the key-ways of said inner member, and a stud threadedly engaging the end of said inner member for securing said cap member in position on said inner axle member.

46. In combination with a tractor, a housing, an axle journalled in said housing, supporting wheels mounted on said axle, means for adjusting said wheels on said axle, a transverse frame member, and longitudinal frame members connected to the ends of said axle and adjustably connected to said transverse frame member.

47. In combination with a tractor, a housing, an axle journalled in said housing, supporting wheels mounted on said axle, means for adjusting said wheels on said axle, longitudinal frame members connected to said housing, a transverse frame member carried by said longitudinal frame members, and other longitudinal frame members adjustably secured to said transverse frame member and connected to the ends of said axle on the outer sides of said wheels.

48. In combination with a tractor, a housing, an axle journalled in said housing, supporting wheels mounted on said axle, means for adjusting said wheels on said axle, longitudinal frame members suported by said axle, a transverse frame member secured to said longitudinal frame members, a second transverse frame member suspended from said first named transverse frame member, and means for forming draft connections on either of said transverse frame members.

49. In combination with a tractor, a housing, an axle journalled in said housing, supporting wheels mounted on said axle, means for adjusting said wheels on said axle, longitudinal frame members supported by said axle, a transverse frame member secured to said longitudinal frame members, a second transverse frame member suspended from said first named transverse frame member, and a plate connected to said housing and extending therefrom to said second named transverse frame member.

50. In combination with a tractor, a housing, an axle journaled in said housing, supporting wheels mounted on said axle, means for adjusting said wheels on said axle, longitudinal frame members supported by said axle, a transverse frame member secured to said longitudinal frame members, a second transverse frame member suspended from said first named transverse frame member, a plate connected to said housing and extending therefrom to said second named transverse frame member, and other longitudinal frame members adjustably connected to said first named transverse frame member and connected to the outer ends of the hubs of said wheels.

51. In combination, a rotatable axle, a wheel hub rotatable therewith and shiftably mounted thereon, an adjustable element mounted in the axle, and a coupling cap secured to the hub and connected with said element to provide for the shifting of the hub on the axle when said element is adjusted.

52. In a tractor, a main frame comprising a transmission case, transmission mechanism mounted in said case, a bearing hub within said case and integral therewith, said case having side extensions provided with bearings, a driving axle formed in two sections both journalled at their inner ends in said bearing hub and near their middle points in the bearings of said side extensions, driving wheels slidably splined on said axle sections, and operating connections from said transmission mechanism to said axle sections on the outer sides of said hub.

53. In a tractor, a transmission case, a bearing hub within said case, a driving axle having two hollow rotatable sections extending into said case and journalled in said bearing hub, and means for supplying oil through said hub to the interior of each of said axle sections.

54. In a tractor, a transmission case, an axle comprising two hollow sections journalled in said case, supporting tubes mounted in said axle sections, and means for causing oil to flow from said case through said axle sections and said tubes.

55. In a tractor, a main frame comprising a hollow oil tight transmission case, a hollow driving axle in two sections journalled therein, a hollow tube within each of said sections, said tubes being mounted to form recesses between them and the hollow axle sections, said axle sections and said tubes having inter-connecting passages through their walls, a driving wheel mounted on each section of said axle, means for causing oil to circulate through said tubes and said axles to said hubs.

In testimony whereof, I have subscribed my name.

WELDON C. RARIG.